United States Patent
Lim et al.

(10) Patent No.: US 9,807,258 B1
(45) Date of Patent: Oct. 31, 2017

(54) PRINT DATA PROCESSING METHOD OF MOBILE DEVICE AND THE MOBILE DEVICE

(71) Applicant: S-Printing Solution Co., Ltd., Suwon-si (KR)

(72) Inventors: Mok-hwa Lim, Suwon-si (KR); Hyun-sub Kil, Suwon-si (KR); In-Cheon Park, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/412,335

(22) Filed: Jan. 23, 2017

(30) Foreign Application Priority Data

Jul. 8, 2016 (KR) .................. 10-2016-0087115

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ....... *H04N 1/00228* (2013.01); *G06F 3/1207* (2013.01); *G06F 3/1226* (2013.01); *G06F 3/1267* (2013.01); *G06F 3/1292* (2013.01); *H04N 1/00307* (2013.01); *H04N 2201/0094* (2013.01)

(58) Field of Classification Search
CPC .......... H04N 1/00228; H04N 1/00307; H04N 2201/0094; G06F 3/1207; G06F 3/1226; G06F 3/1267; G06F 3/1292

USPC ................. 358/1.15, 1.13, 1.14, 1.1
See application file for complete search history.

(56) References Cited

U.S. PATENT DOCUMENTS

| | | |
|---|---|---|
| 2009/0103124 A1 | 4/2009 | Kimura et al. |
| 2011/0235120 A1 | 9/2011 | Kinoshita et al. |
| 2012/0038948 A1 | 2/2012 | Park |
| 2012/0250072 A1 | 10/2012 | Miller et al. |
| 2013/0163048 A1* | 6/2013 | Kida .............. G06F 3/1296 358/1.15 |
| 2013/0229690 A1* | 9/2013 | Sumita .............. H04N 1/00127 358/1.15 |
| 2014/0104643 A1 | 4/2014 | Park |
| 2014/0355047 A1 | 12/2014 | Lee et al. |

FOREIGN PATENT DOCUMENTS

JP        2009-37591        2/2009

OTHER PUBLICATIONS

International Search Report dated May 19, 2017 in International Patent Application No. PCT/KR2017/000938.

* cited by examiner

*Primary Examiner* — Douglas Tran
(74) *Attorney, Agent, or Firm* — Staas & Halsey LLP

(57) ABSTRACT

A mobile device includes a communication unit configured to communicate with an image forming apparatus; a display configured to display a screen; a memory configured to store a printing list; and a controller configured to search for an adjacent image forming apparatus through the communication unit, check whether there is content to be printed in the printing list stored in the memory, and control the display to display notification information on the screen based on a result of the checking.

16 Claims, 8 Drawing Sheets

FIG. 6

| DOCUMENT NUMBER TO BE PRINTED | SERVICE OR APP | LOCATION INFORMATION OF CONTENT | SNAPSHOT IMAGE OF CONTENT |
|---|---|---|---|
| 1 | Print it later | /storage/extSdCard/Download/test.pdf | IMAGE FILE 1 |
| 2 | Google Drive | test.doc | IMAGE FILE 2 |
| 3 | Gmail | Check stared mail through Android API | IMAGE FILE 3 |
| 4 | Web Browser | http://samsung.com/test.html | IMAGE FILE 4 |
| 5 | ... | ... | IMAGE FILE 5 |

PRINT DATA PROCESSING METHOD OF MOBILE DEVICE AND THE MOBILE DEVICE

CROSS-REFERENCE TO RELATED APPLICATIONS

This application claims the priority benefit of Korean Patent Application No. 10-2016-0087115, filed on Jul. 8, 2016, in the Korean Intellectual Property Office, the disclosure of which is incorporated herein in its entirety by reference.

BACKGROUND

1. Field

The following description relates to a method of printing using a mobile device and content, and the mobile device performing the method.

2. Description of the Related Art

According to the development of communication technology, a mobile printing method for printing content stored in a mobile device through an image forming apparatus connected to the mobile device wirelessly is being studied. According to the mobile printing method, a user drives a printing application installed on a mobile device and selects content to be printed, searches for an adjacent available image forming apparatus, and prints the selected content through a found adjacent available image forming apparatus. However, when an adjacent available image forming apparatus is not found, the content is unable to be printed and thus the user may be inconvenienced.

SUMMARY

Provided are a print data processing method and a mobile device, wherein, when an available image forming apparatus is not around the mobile device, content may be printed by changing a printing job of content to a printing standby state and then providing a notification to a user when an available image forming apparatus is found later.

Provided are a print data processing method and a mobile device, wherein, when an image forming apparatus a user has used before is found while there is a printing job in a printing standby state, a notification is provided to a user and content is transmitted to the found image forming apparatus.

Additional aspects will be set forth in part in the description which follows and, in part, will be apparent from the description, or may be learned by practice of the presented embodiments.

According to an aspect of an embodiment, a mobile device includes: a communication unit configured to communicate with an image forming apparatus; a display configured to display a screen; a memory configured to store a printing list; and a controller configured to search for an adjacent image forming apparatus through the communication unit, check whether there is content to be printed in the printing list stored in the memory, and control the display to display notification information on the screen based on a result of the checking.

The notification information may include a list of content to be printed. The notification information may include a message related to printing. The notification information may include a user interface (UI) element for receiving a print command from a user.

The controller may control the display to display a snapshot image of content included in the printing list. The controller may control the display to display a notification bar at a top of the display, and to display, in the notification bar, an icon corresponding to a found adjacent image forming apparatus based on a result of searching for the adjacent image forming apparatus. The controller may control the display to display the notification information based on a user input of touching and dragging the notification bar while the icon is displayed in the notification bar. The controller may transmit content included in the printing list to a found adjacent image forming apparatus based on a user input of selecting a UI element corresponding to a print command. The controller may receive a print command of content while the content is displayed on the display, and transmit the content to a found adjacent image forming apparatus or adds a file name of the content to the printing list based on a result of searching for the adjacent image forming apparatus and the print command.

According to an aspect of an embodiment, a non-transitory computer-readable recording medium has recorded thereon commands, which, when executed by a controller, searches for an adjacent image forming apparatus through a communication unit, checks whether there is content to be printed in a printing list when an image forming apparatus is found, displays notification information on a display based on a result of the checking, and transmits the content included in the printing list to the found image forming apparatus through the communication unit based on a user input of selecting a print command.

According to an aspect of an embodiment, a non-transitory computer-readable recording medium has recorded thereon commands, which, when executed by a controller, searches for an adjacent image forming apparatus through a communication unit, checks a printing list, and displays notification information on a display based on a result of searching for the adjacent image forming apparatus and a result of checking the printing list.

According to an aspect of an embodiment, a printing method of a mobile device, the printing method includes: searching for an adjacent image forming apparatus through a communication unit; checking whether there is content to be printed in a printing list when an image forming apparatus is found; displaying, on a display, notification information based on a result of the checking; and transmitting the content included in the printing list to the found image forming apparatus based on a user input of selecting a print command.

The notification information may include a list of content to be printed. The notification information may include a message related to printing. The notification information may include a user interface (UI) element for receiving the print command from a user.

According to an aspect of an embodiment, a mobile printing system includes: a mobile device configured to search for an adjacent image forming apparatus, check whether content to be printed is included in a printing list when an image forming apparatus is found, display notification information on a screen based on a result of the checking, and transmit the content included in the printing list to the found image forming apparatus based on a print command; and an image forming apparatus configured to print the content transmitted from the mobile device.

BRIEF DESCRIPTION OF THE DRAWINGS

These and/or other aspects will become apparent and more readily appreciated from the following description of the embodiments, taken in conjunction with the accompanying drawings in which:

FIG. 6 illustrates an example of a printing list according to an embodiment;

DETAILED DESCRIPTION

Figure 1:
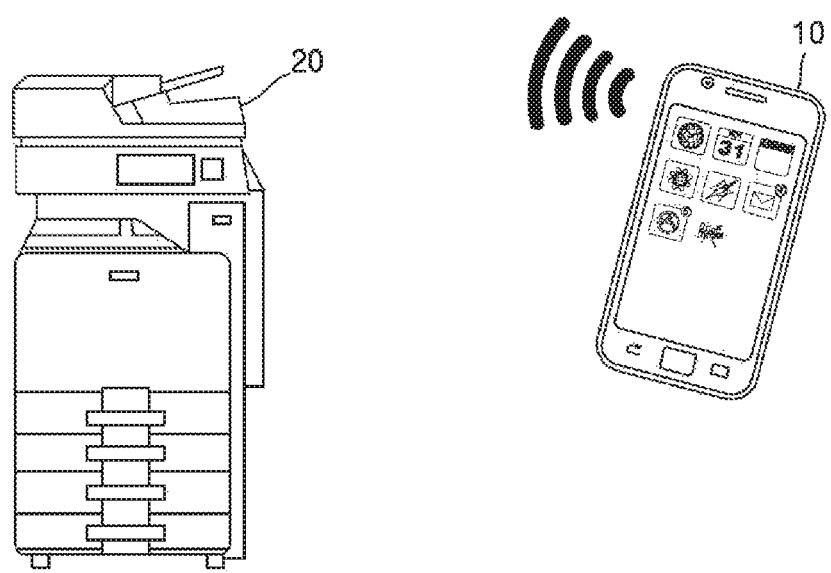
FIG. 1 is a diagram illustrating a configuration between a mobile device and an image forming apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the specification, a "unit" or "module" may be embodied as hardware and/or software, and a plurality of "units" may be embodied as one element or one "unit" may include a plurality of elements.

In the specification, when an element is "connected" to another element, the elements may not only be "directly connected", but may also be "electrically connected" via another element therebetween.

In the specification, an "image forming job" may denote any one of various jobs (for example, printing, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, or a multi-function printer (MFP). Also, "content" may denote any type of data that is a target of an image forming job, such as a picture, an image, or a document file. Also, "print data" may denote data having a format printable by an image forming apparatus. Also, "content" may denote "print data".

Also, a "scan file" may denote a file generated by scanning an image by using a scanner. Also, a "user" may denote a person who performs manipulation related to an image forming job by using an image forming apparatus or a device connected to the image forming apparatus wirelessly or via wires. Also, a "user" may denote an apparatus (for example, an artificial intelligence electronic device or robot) performing manipulation related to an image forming job.

In the specification, a "user interface (UI) element" may denote a graphic object displayed on a screen to receive an input from a user or provide information to the user. Also, a "UI element" may denote an object interacting with a user and providing visual, auditory, tactile, and olfactory feedback according to a user input.

In the specification, an "application" or an "app" denotes a series of computer program groups designed to perform a predetermined task. In the specification, there may be a variety of applications. Examples of an application may include a game application, a video reproducing application, a map application, a memo application, a calendar application, a phone book application, a broadcasting application, an exercise supporting application, a payment application, a picture folder application, a medical device controlling application, and a UI providing application, but are not limited thereto.

One or more embodiments of the present disclosure will now be described with reference to accompanying drawings.

FIG. 1 is a diagram of a mobile printing system including a mobile device 10 and an image forming apparatus 20, according to an embodiment.

Referring to FIG. 1, the mobile device 10 and the image forming apparatus 20 are illustrated.

The mobile printing system may include the mobile device 10 that searches for an adjacent, or nearby, image forming apparatus, checks whether content to be printed is included in a printing list when the image forming apparatus 20 is found, displays notification information on a screen based on a result of the checking, and transmits the content included in the printing list to the image forming apparatus 20 based on a print command, and the image forming apparatus 20 printing the content transmitted from the mobile device 10.

The mobile device 10 may include a communication unit and may be connected to the image forming apparatus 20 through a local area network. In other words, the mobile device 10 may be connected to the image forming apparatus 20 via wireless communication when the image forming apparatus 20 is adjacent to the mobile device 10. For example, the mobile device 10 may be connected to the image forming apparatus 20 via Bluetooth and/or Wi-Fi, and perform a printing job by transmitting content stored in the mobile device 10 to the image forming apparatus 20. The content may be data forming the content or print data for printing the content.

The mobile device 10 may generate print data of the content by performing a rendering job on the content so as to print the content, and perform the printing job by transmitting the print data to the image forming apparatus 20.

According to an embodiment, the mobile device 10 may transmit the content to the image forming apparatus 20 without performing the rendering job on the content, and the image forming apparatus 20 may render the received content to perform the printing job. Hereinafter, it is described that the rendering job is performed by the mobile device 10, but an embodiment is not limited thereto.

Also, transmitting of the content to the image forming apparatus 20 may refer to performing the printing job on the content and transmitting the content or the print data of the content to the image forming apparatus 20.

When a user inputs a print command to perform the printing job while the content is displayed on a display of the mobile device 10, the mobile device 10 may generate the print data by performing the rendering job on the content. When the image forming apparatus 20 connected to the mobile device 10 is found around the mobile device 10, the mobile device 10 may perform the printing job by transmitting the content to the image forming apparatus 20.

When the image forming apparatus 20 connected to the mobile device 10 is not around the mobile device 10, the mobile device 10 may assign a file name to the print data and then store the print data in a memory of the mobile device 10. Here, the file name of the print data may be obtained by adding a predetermined character to an original file name of the content. For example, when the original file name of the content is "abc.doc", the file name of the print data may be "#abc.doc".

When the image forming apparatus 20 is connected to the mobile device 10, the mobile device 10 may search for the file name having the predetermined character and transmit the print data having the file name to the image forming apparatus 20 to perform the print job.

Alternatively, the mobile device 10 may add the file name having the predetermined character to the printing list, and check the printing list to perform the printing job.

The printing list may include the content, the original file name of the content, and/or the print data of the content.

When the mobile device 10 received the print command with respect to the content but there is no image forming apparatus 20 connected to the mobile device 10 or an image forming apparatus 20 is not found around the mobile device 10, the mobile device 10 may distinguish the content from general files by adding the predetermined character to the original file name, and perform the printing job when the image forming apparatus 20 is found later. Alternatively, the mobile device 10 may add the original file name of the content to be printed to the printing list.

Upon receiving the content from the mobile device 10, the image forming apparatus 20 may perform the printing job to print the content.

Figure 2:
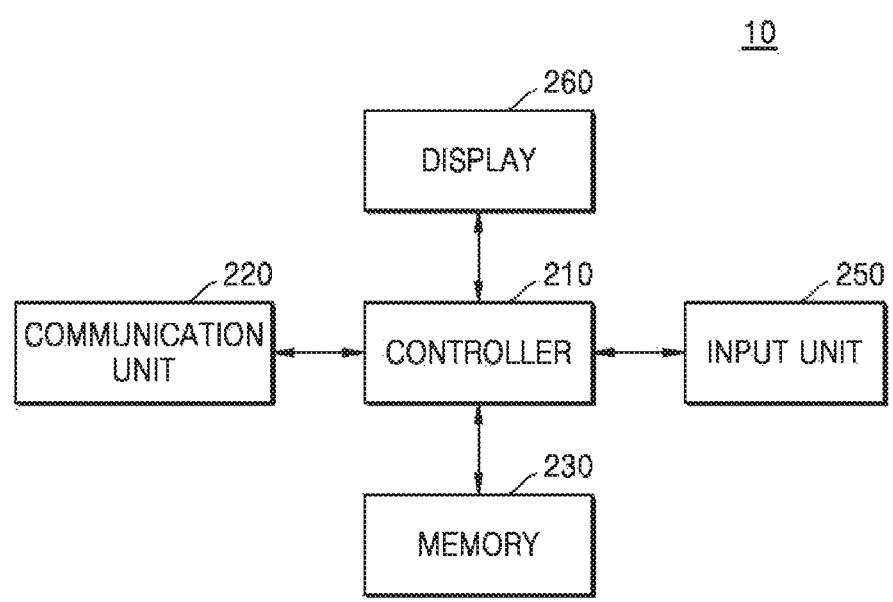
FIG. 2 is a block diagram of a mobile device according to an embodiment.

FIG. 2 is a block diagram of the mobile device 10 according to an embodiment.

Referring to FIG. 2, the mobile device 10 may include a controller 210, a communication unit 220, a memory 230, a display 260, and an input unit 250. Meanwhile, a structure of the mobile device 10 shown in FIG. 2 is only an example, and thus is not limited thereto. Accordingly, at least one component of the mobile device 10 of FIG. 2 may be omitted or modified, or at least one component may be added to the mobile device 10, depending on a type and purpose of the mobile device 10.

The input unit 250 receives an input for performing the printing job from the user. The input unit 250 may include, for example, a keyboard, a physical button, an electronic pen, or a touch screen.

The controller 210 controls all operations of the mobile device 10. The controller 210 may control components included in the mobile device 10 to perform operations corresponding to a user input received through the input unit 250.

Also, the controller 210 may execute a program stored in the memory 230, read a file stored in the memory 230, or store a new file in the memory 230.

The controller 210 may search for an image forming apparatus adjacent to the mobile device 10 through the communication unit 220, check whether there is content to be printed in the printing list when an image forming apparatus is found, display notification information on the display 260 based on a result of the checking, and transmit the content included in the printing list to the found image forming apparatus based on a user input of selecting the print command. The notification information may include a list of content to be printed. Also, the notification information may include a message related to printing. Also, the notification information may include a user interface (UI) element for receiving the print command from the user.

The controller 210 may control the display 260 to display a snapshot image of the content included in the printing list.

After the content is transmitted, the controller 210 may store information related to the transmitting of the content in the memory 230.

The controller 210 may control the display 260 to display a notification bar at the top of the display 260 and to display a printer icon in the notification bar based on the result of searching for an image forming apparatus.

The controller 210 may receive a user input of touching and dragging the notification bar while the printer icon is displayed in the notification bar, and control the display 260 to display the notification information based on the user input.

The controller 210 may transmit the content included in the printing list to the found image forming apparatus based on a user input of selecting a UI element corresponding to the print command.

The controller 210 may receive the print command with respect to the content while the content is displayed on the display 260, and generate and transmit, to the image forming apparatus, the print data of the content based on the result of searching for the image forming apparatus and the print command or add the original file name of the content to the printing list.

The communication unit 220 may communicate with another device wirelessly or via wires.

The communication unit 220 may include at least one of a short distance communication module, a wired communication module, and a wireless communication module. The communication unit 220 may find the image forming apparatus 20 adjacent to the mobile device 10 by using the short distance communication module (for example, Bluetooth or Wi-Fi). For example, the mobile device 10 may transmit a broadcasting signal to find the image forming apparatus 20. Upon receiving the broadcasting signal, the image forming apparatus 20 may transmit identification (ID) data of the image forming apparatus 20 to the mobile device 10. Upon receiving the ID data of the image forming apparatus 20, the mobile device 10 may determine that the image forming apparatus 20 exists around the mobile device 10, and transmit the print data to the image forming apparatus 20.

The memory 230 may store various types of data, such as various programs and files required for operations of the mobile device 10. The memory 230 may be embodied as a non-volatile memory, a volatile memory, a flash memory, a hard disk drive (HDD), or a solid state drive (SSD). The memory 230 may be accessed by the controller 210, and data may be read, recorded, amended, deleted, or updated by the controller 210. According to an embodiment, a memory may include the memory 230, read-only memory (ROM) or random access memory (RAM) in the controller 210, or a memory card (not shown, for example, a micro secure digital (SD) card or a memory stick) installed in the memory device 10. Also, the memory 230 may store programs and data for configuring various screens to be displayed in a display region of the display 260.

The memory 230 may store commands of searching for an image forming apparatus around the mobile device 10 through the communication unit 220 when executed by the controller 210, checking whether there is content to be printed in the printing list when an image forming apparatus is found, displaying notification information on the display 260 based on a result of the checking, and transmitting the content included in the printing list to the found image forming apparatus through the communication unit 220 based on a user input of selecting the print command.

The display 260 may include, for example, a liquid crystal display (LCD), a light-emitting diode (LED) display, an organic light-emitting diode (OLED) display, a microelectromechanical systems (MEMS) display, or an electronic paper display. The display 260 may display, for example, various types of content and UI elements (for example, texts, images, videos, icons, and/or symbols). The display 260 may include a touch screen to perform functions of an input unit, for example, to receive a touch, gesture, proximity, or hovering input using an electronic pen or a part of a human body.

Figure 3:
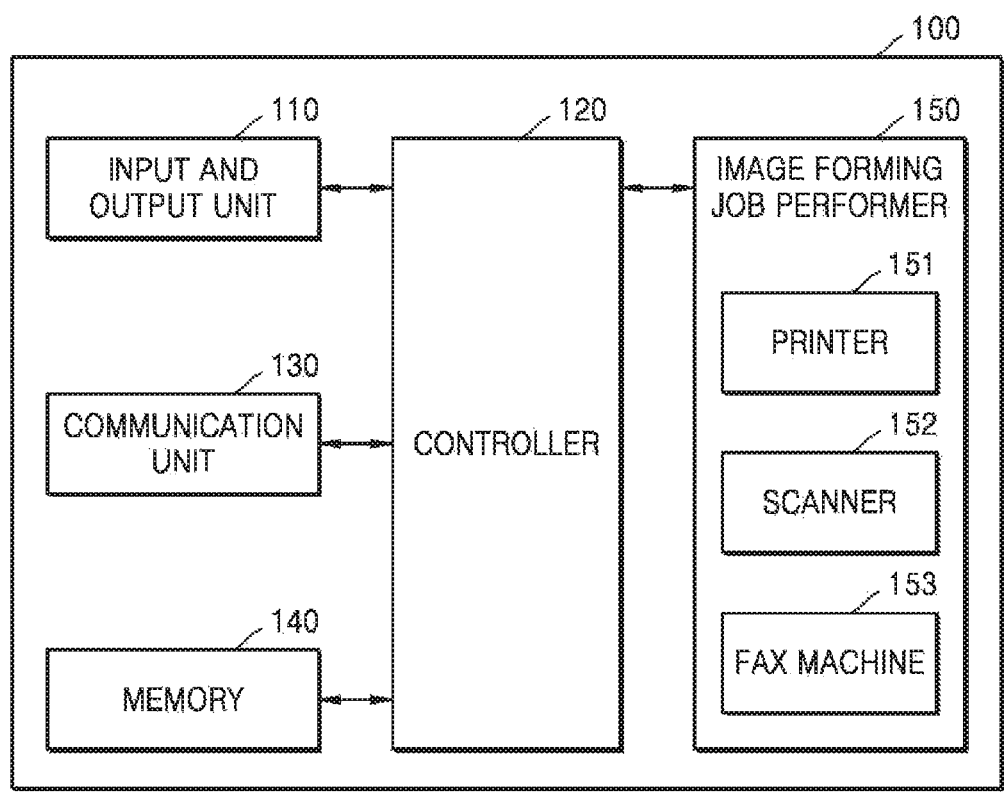
FIG. 3 is a block diagram of an image forming apparatus according to an embodiment.

FIG. 3 is a block diagram of an image forming apparatus 100 according to an embodiment.

Referring to FIG. 3, the image forming apparatus 100 may include an input and output unit 110, a controller 120, a communication unit 130, a memory 140, and an image forming job performer 150.

The input and output unit 110 may include an input unit for receiving an input for performing an image forming job from a user, and an output unit for displaying information, such as a result of performing an image forming job or a state of the image forming apparatus 100. For example, the input unit may include a keyboard, a physical button, or a touch screen. Also, the output unit may include a display panel.

The controller 120 controls all operations of the image forming apparatus 100, and may include a processor, such as a central processing unit (CPU). The controller 120 may control other components included in the image forming apparatus 100 such that an operation corresponding to a user input received through the input and output unit 110 is performed.

Also, the controller 120 may execute a program stored in the memory 140, read a file stored in the memory 140, or store a new file in the memory 140.

The communication unit 130 may communicate with another device in a wired or wireless manner. Accordingly, the communication unit 130 may include at least one of a short distance communication module, a wired communication module, and a wireless communication module.

The communication unit 130 may be connected to an external device (not shown, for example, a mobile device) provided outside the image forming apparatus 100 to transmit a signal or data received from the external device to the controller 120 or to transmit a signal or data generated by the controller 120 to the external device. For example, when the communication unit 130 receives a print command and content from the external device, the controller 120 may change the received content to print data and print the print data through a printer 151. In this case, the external device may be at least one of, for example, a smart phone, a personal computer (PC), a server, an electronic device, a medical device, a camera, and a wearable device.

The memory 140 may store various types of data, such as programs and files. Also, the memory 140 may include an external memory connected to the image forming apparatus 100 through an input and output port.

The image forming job performer 150 may include the printer 151, a scanner 152, and a fax machine 153. However, as occasion demands, the image forming job performer 150 may include only some of them.

The printer 151 may form an image on a recording medium via any one of various printing methods, such as an electrophotography method, an inkjet method, a thermal transfer method, and a thermal method. The scanner 152 may irradiate light onto paper and receive light reflected from the paper to read an image recorded on the paper. The fax machine 153 may share a component for scanning an image with the scanner 152, share a component for printing a received file with the printer 151, transmit a scan file to a destination, or receive a file from an external source.

Figure 4:
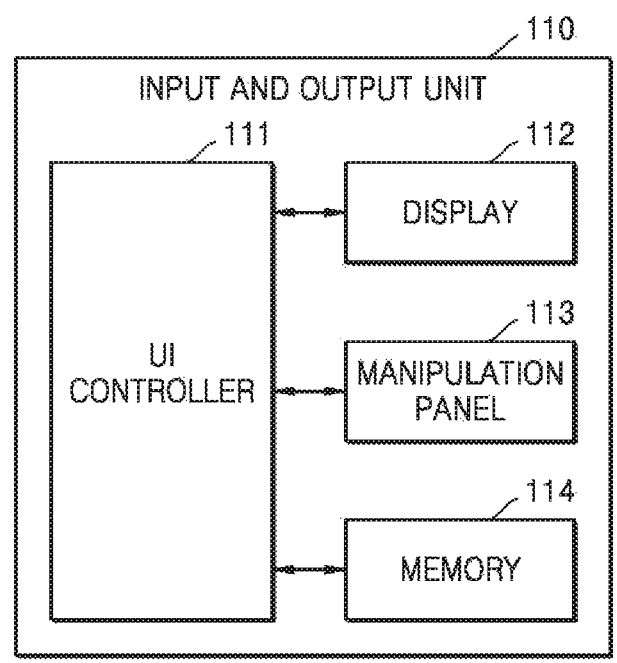
FIG. 4 is a block diagram of an input and output unit of an image forming apparatus, according to an embodiment.

FIG. 4 is a block diagram of the input and output unit 110 of the image forming apparatus 100, according to an embodiment.

Referring to FIG. 4, the input and output unit 110 may include a UI controller 111, a display 112, a manipulation panel 113, and a memory 114.

The input and output unit 110 may include an independent control system (the UI controller 111 and the memory 114) separately from the controller 120. Like the controller 120, the UI controller 111 may include a processor, such as a CPU, and control a UI provided by the input and output unit 110.

The display 112 may include an LCD panel or an OLED panel, and the manipulation panel 113 may include a physical button or a touch screen.

Figure 5:
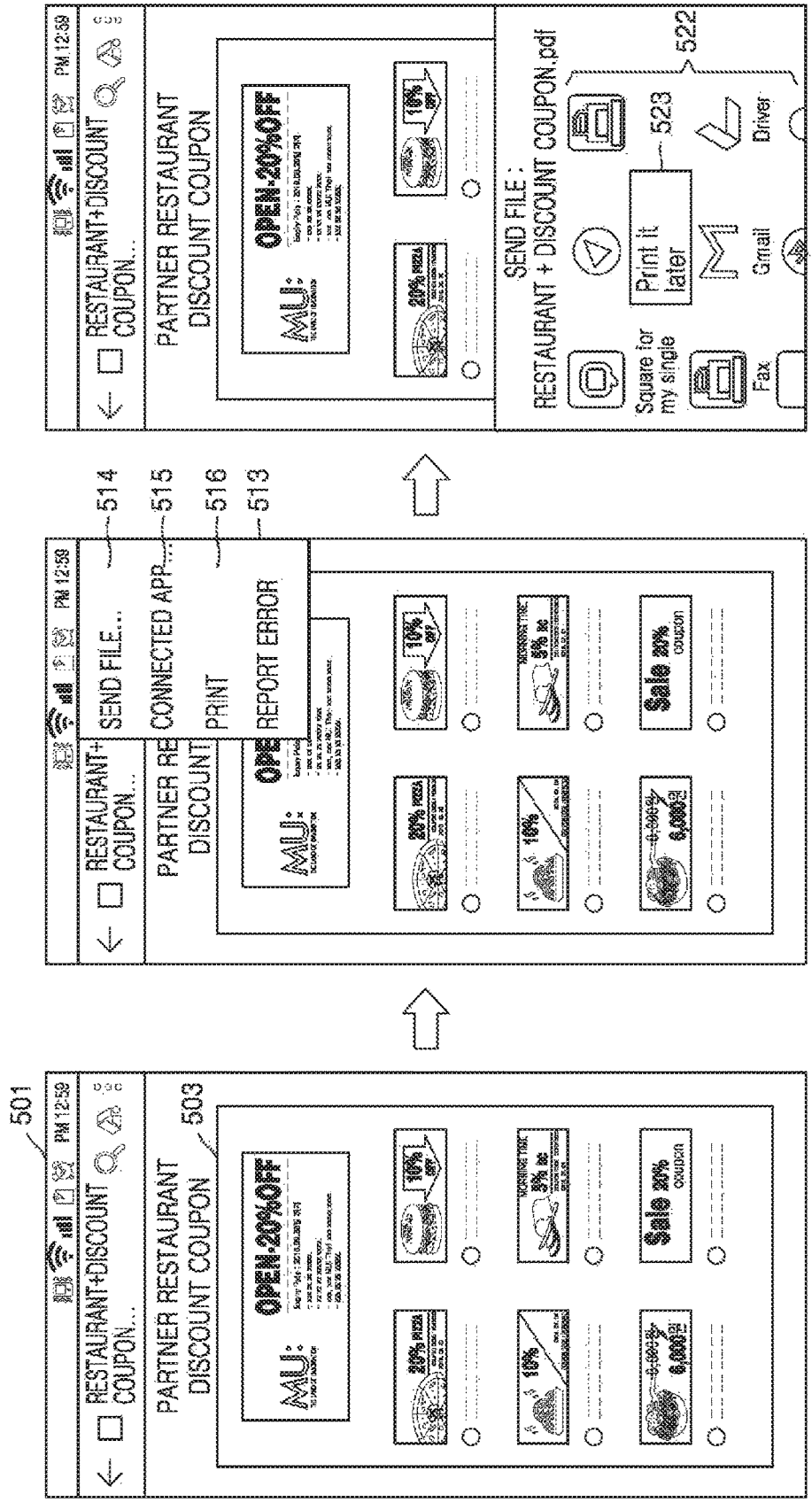
FIG. 5 illustrates processes of performing a printing job in a mobile device, according to an embodiment.

FIG. 5 illustrates processes of performing a printing job in a mobile device, according to an embodiment.

Referring to FIG. 5, content 503 is displayed on a screen 501 of the mobile device. The content 503 may include, for example, discount coupons. When a user selects one of the discount coupons displayed on the screen 501, and touches and selects a menu icon (not shown), a plurality of items 513 for processing the selected discount coupon may be displayed on the screen 501. The plurality of items 513 may be commands receivable from the user to process the selected discount coupon. For example, the plurality of items 513 may include 'send file' 514, 'connected app' 515, and 'print' 516. The user may transmit the selected discount coupon to another person by selecting the 'send file' 514. The user may apply the selected discount coupon to another application by selecting the 'connected app' 515. The user may print the selected discount coupon by selecting the 'print' 516.

When the user selects the 'connected app' 515, the mobile device may display a list 522 of a plurality of applications corresponding to the selected discount coupon on a screen. When the user selects 'print it later' 523 application from the list 522, the mobile device may register the selected discount coupon in a printing list.

The mobile device may provide notification information to the user when an adjacent image forming apparatus is found while content is registered in the printing list. The notification information may be provided through, for example, a notification bar displayed at the top of a screen of the mobile device. In other words, for example, the mobile device may notify the user that the selected discount coupon is printable by displaying a printer icon in the notification bar. Also, when the user drags the notification bar to the bottom of the screen, the mobile device may display, on the screen, a list of content to be printed, a message requesting for a print command, and a UI element (for example, a check box) for receiving a print command.

FIG. 6 illustrates an example of a printing list 600 according to an embodiment. The printing list 600 may be stored in a memory as a text file.

Referring to FIG. 6, the printing list 600 may include a 'document number to be printed' 601, a related 'service or app' 603, 'location information of content' 605, and a 'snapshot image of content' 607. For example, the 'document number to be printed' 601 may be an order that documents are registered in the printing list 600. The 'service or app' 603 may be a name of an application related to content. The 'location information of content' 605 may be a path or a file name for storing content. The 'snapshot image of content' 607 may be a thumbnail image corresponding to content.

A mobile device may register content to be printed in the printing list 600 via any one of various methods.

For example, when a user marks with a star an email while checking emails, the mobile device may register text and attached content of the marked email in the printing list 600.

When the user marks with stars a folder and a file to be printed after accessing a cloud drive, the mobile device may register the marked folder and the marked file in the printing list 600.

When an image forming apparatus is found around the mobile device while content is registered in the printing list 600, the mobile device may search for content included in a marked folder or marked content and transmit print data of content or content to the found image forming apparatus. When content is not registered in the printing list 600, the mobile device may not search for an image forming apparatus. In other words, the mobile device may determine whether to search for an image forming apparatus based on the printing list 600.

According to an embodiment, the mobile device may transmit the print data to the image forming apparatus or register the print data in the printing list 600 based on a print command of the user and connection to the image forming apparatus.

When the user selects content and then inputs a print command, the mobile device may determine whether there is an image forming apparatus connected to the mobile device based on the print command of the user, and transmit print data of the selected content to the image forming apparatus when it is determined that the image forming apparatus is connected to the mobile device. The mobile device searches for an available image forming apparatus around the mobile device when there is no image forming apparatus connected to the mobile device. When an available image forming apparatus is found around the mobile device, the mobile device transmits the print data to the found available image forming apparatus. When an available image forming apparatus is not found, the mobile device may register the print data in the printing list 600.

Figure 7:
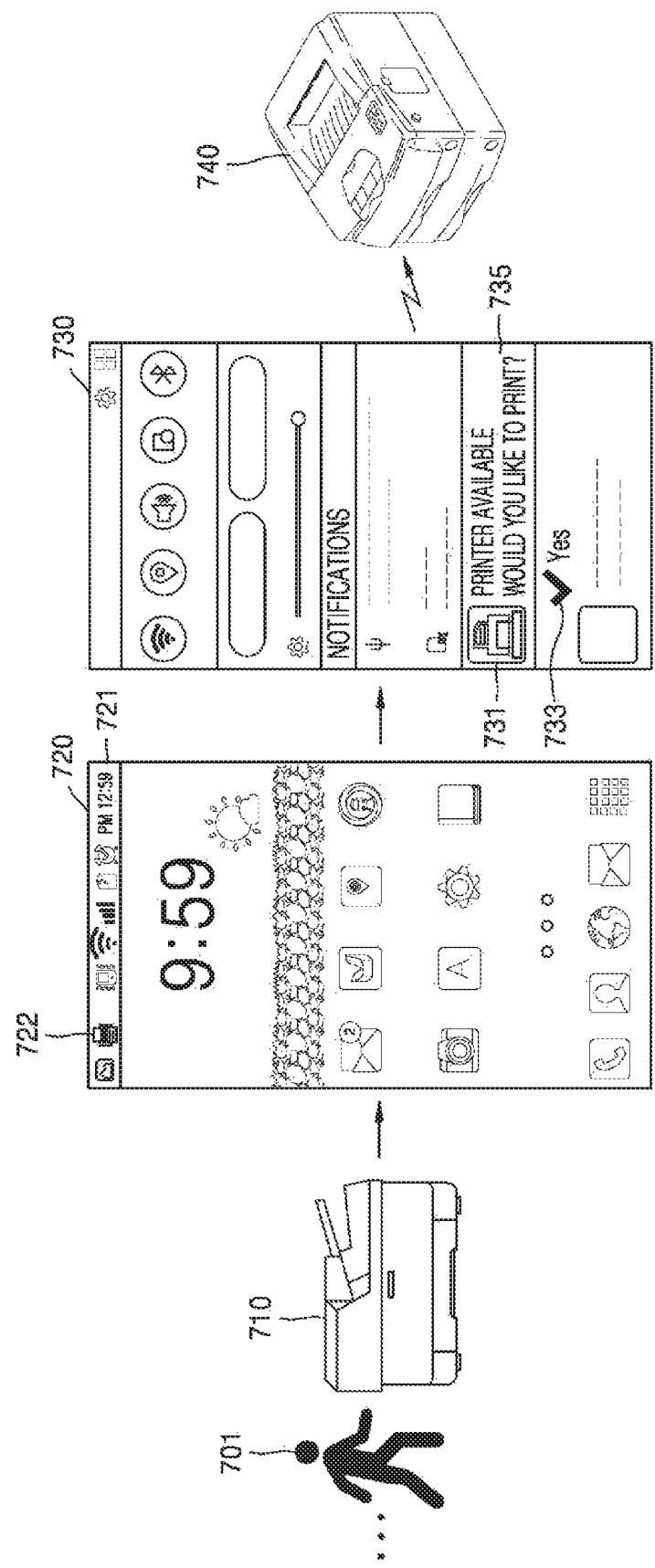
FIG. 7 illustrates an example of a mobile device searching for an adjacent image forming apparatus, according to an embodiment.

FIG. 7 illustrates an example of a mobile device searching for an adjacent image forming apparatus, according to an embodiment.

Referring to FIG. 7, when a user 701 approaches an image forming apparatus 710 while holding a mobile device, the mobile device may search for and find the image forming apparatus 710.

According to an embodiment, the mobile device may find the image forming apparatus 710 when the mobile device is connected to the same router as the image forming apparatus 710. For example, when the mobile device approaches the image forming apparatus 710, the mobile device may be connected to the router to which the image forming apparatus 710 is connected. When the mobile device is connected to the same router as the image forming apparatus 710, the mobile device may provide, to the user 701, notification information, and output a message indicating that the image forming apparatus 710 is available and/or automatically display a list of content to be printed on a screen.

As an example, the mobile device may be connected to the image forming apparatus 710 via Wi-Fi direct, and provide notification information to the user 701.

As an example, the mobile device may provide notification information to the user 701 when an image forming apparatus pre-registered in a print-related application (for example, a mobile printing application) is found. Also, when an image forming apparatus is newly found, the mobile device may perform a separate registration process.

As an example, the mobile device may find an image forming apparatus around the mobile device via Bluetooth or near field communication (NFC), and transmit print data to the found image forming apparatus. For example, the mobile device may periodically transmit a broadcasting signal and provide notification information when a response signal is received from an adjacent image forming apparatus. According to an embodiment, the mobile device may periodically transmit a broadcasting signal only when content to be printed is included in a printing list to find an adjacent image forming apparatus. Accordingly, battery consumption of the mobile device may be reduced.

As an example, when the user 701 tags an NFC tag, the mobile device may detect the NFC tag through an NFC module and provide notification information to the user 701.

The mobile device may search for an image forming apparatus, as described above, while content is registered in a printing list, and when an image forming apparatus is found, display notification information 722 on a screen 720. The notification information 722 may be displayed in a notification bar 721, but an embodiment is not limited thereto. Also, the mobile device may provide the notification information 722 via auditory or tactile feedback. The notification information 722 may be an icon having a printer shape, but is not limited thereto.

When the user 701 drags the notification bar 721 downward while the notification information 722 is displayed in the notification bar 721, a printable state notification icon 731, printable state notification message 735, and a UI element 733 requesting the user 701 to check a printing job may be displayed on a screen 730. When the user 701 selects the UI element 733, the mobile device may transmit print data of content included in the printing list to a found image forming apparatus 740. The print data may be obtained by rendering the content suitably for a printing job.

Alternatively, the mobile device may transmit the content directly to the image forming apparatus 740 without rendering the content. In this case, the image forming apparatus 740 may render the received content and then perform the printing job.

Figure 8:
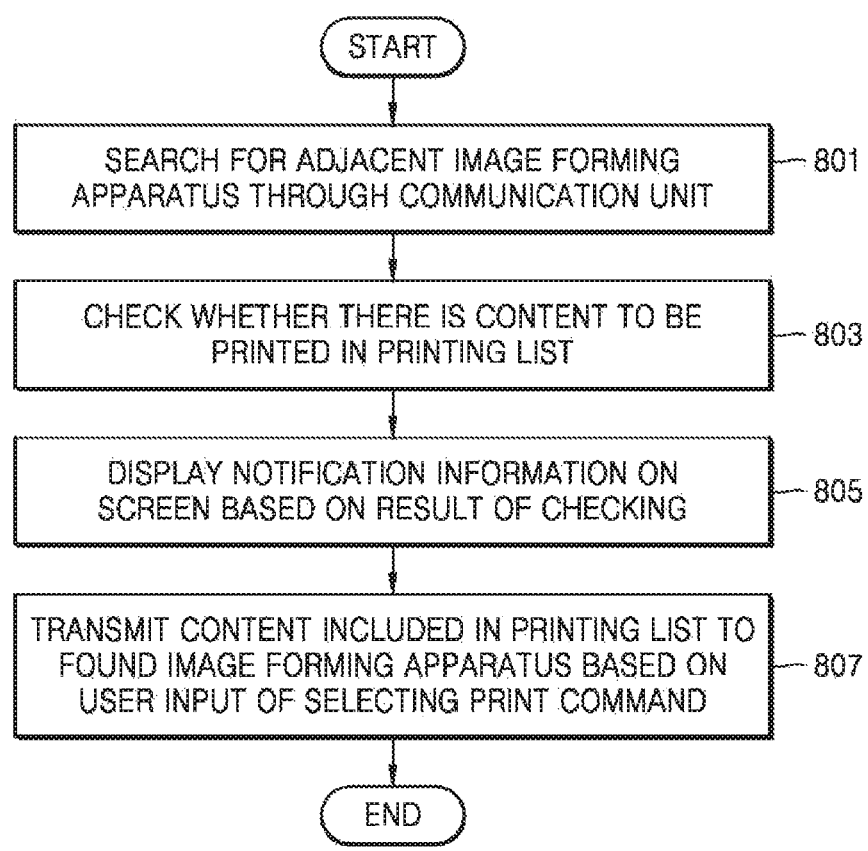
FIG. 8 is a flowchart of a method of searching for, by using a mobile device, an adjacent image forming apparatus and requesting a printing job, according to an embodiment.

FIG. 8 is a flowchart of a method of searching for, by using a mobile device, an adjacent image forming apparatus and requesting a printing job, according to an embodiment.

Referring to FIG. 8, the mobile device searches for the adjacent image forming apparatus through a communication unit, in operation 801. The mobile device may search for the adjacent image forming apparatus through a local area network based on content included in a printing list. In other words, when content is included in the printing list, the mobile device determines that there is a printing job.

Because a method of searching for and finding, by using the mobile device, an adjacent image forming apparatus has been described above with reference to FIG. 7, repeated descriptions thereof are not provided.

When the mobile device finds an image forming apparatus and is connected to the image forming apparatus, the mobile device checks whether there is content to be printed in the printing list, in operation 803. When there is content to be printed in the printing list, as shown in the printing list 600 of FIG. 6, the mobile device may transmit print data of the content or the content to the image forming apparatus found in operation 801.

In operation 805, the mobile device displays notification information on a screen based on a result of the checking in operation 803. The notification information may be displayed in a notification bar of the screen. Also, the notification information may include a list of content to be printed and a UI element requesting a user to check a printing job.

When the user inputs a command to perform the printing job, the mobile device may transmit the content included in the printing list in operation 807 to the image forming apparatus found in operation 801, based on a user input of selecting a print command.

The embodiments described above may be embodied as computer-readable codes on a non-transitory computer-readable recording medium storing commands and data executable by a computer. At least one of the commands and the data may be stored in a form of a program code, and may perform an operation by generating a program module when executed by a controller.

Examples of the non-transitory computer-readable recording medium include magnetic storage media (e.g., ROM, floppy disks, hard disks, etc.), optical recording media (e.g., CD-ROMs, or DVDs), memories included in a server accessible through a network, etc. Also, the non-transitory computer-readable recording medium may be a controller or RAM included in the controller.

For example, the non-transitory computer-readable recording medium may be at least one of the memory 140 of the image forming apparatus 100 or the memory 114 of the input and output unit 110. Alternatively, the non-transitory computer-readable recording medium may be a memory included in an external device (not shown) connected to the image forming apparatus 100 through a network.

According to an embodiment, a mobile device may accumulate content to be printed and when an image forming apparatus capable of performing a printing job is found by monitoring circumstances, notifies a user about the image forming apparatus, and thus the printing job may be performed later even if there is currently no available image forming apparatus around the mobile device.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A mobile apparatus comprising:
a communication unit configured to communicate with an image forming apparatus;
a display configured to display a screen;
a memory configured to store a printing list; and
a controller configured to search for the image forming apparatus using the communication unit, check whether content to be printed is included in the printing list stored in the memory based on a result of the searching, and control the display to display notification information on the screen based on a result of the checking, so that the content to be printed is transmittable to the image forming apparatus using the communication unit based on an input from a user selecting a print command.

2. The mobile apparatus of claim 1, wherein the displayed notification information comprises the content to be printed.

3. The mobile apparatus of claim 1, wherein the displayed notification information comprises a message related to printing on the image forming apparatus.

4. The mobile apparatus of claim 1, wherein the displayed notification information comprises a user interface element for receiving the print command from a user.

5. The mobile apparatus of claim 1, wherein the controller further controls the display to display a snapshot image of the content to be printed.

6. The mobile apparatus of claim 1, wherein the controller further controls the display to display a notification bar at a top of the display, and to display, in the notification bar, an icon corresponding to the image forming apparatus based on a result of searching for the image forming apparatus.

7. The mobile apparatus of claim 6, wherein the controller further controls the display to display the displayed notification information based on an input from the user touching and dragging the notification bar while the icon is displayed in the notification bar.

8. The mobile apparatus of claim 1, wherein the controller is further configured to transmit the content to be printed to the image forming apparatus based on the input from the user selecting a user interface element corresponding to the print command.

9. The mobile apparatus of claim 1, wherein the controller is further configured to receive a print command of additional content while the additional content is displayed on the display, and at least one of transmit the additional content to the image forming apparatus and add a file name of the additional content to the stored printing list based on a result of searching for the image forming apparatus and the received print command.

10. A non-transitory computer-readable recording medium having recorded thereon commands, which, when executed by a controller, search for an image forming apparatus using a communication unit, check whether content to be printed is included in a printing list based on a result of the searching for the image forming apparatus, display notification information on a display based on a result of the checking, and transmit the content to be printed to the image forming apparatus using the communication unit based on an input from a user selecting a print command.

11. A non-transitory computer-readable recording medium having recorded thereon commands, which, when executed by a controller, search for an image forming apparatus using a communication unit, check a printing list based on a result of the searching for the image forming apparatus, and display notification information on a display based on a result of the searching for the image forming apparatus and a result of the checking the printing list, so that content to be printed is transmittable to the image forming apparatus based on an input from a user selecting a print command.

12. A printing method of a mobile apparatus, the printing method comprising:
searching for an image forming apparatus using a communication unit of the mobile apparatus;
checking, using a controller of the mobile apparatus, whether content to be printed is included in a printing list based on a result of the searching for the image forming apparatus;

displaying, on a display, notification information based on a result of the checking; and transmitting, using the communication unit, the content to be printed to the image forming apparatus based on an input from a user selecting a print command.

13. The printing method of claim 12, wherein the displayed notification information comprises the content to be printed.

14. The printing method of claim 12, wherein the displayed notification information comprises a message related to printing on the image forming apparatus.

15. The printing method of claim 12, wherein the displayed notification information comprises a user interface element for receiving the print command from the user.

16. A mobile printing system comprising:

an image forming apparatus; and a mobile apparatus configured to search for the image forming apparatus, check whether content to be printed is included in a printing list stored on the mobile apparatus based on a result of the searching for the image forming apparatus, display notification information on a screen of the mobile apparatus based on a result of the checking, and transmit the content to be printed to the image forming apparatus based on a print command, wherein the image forming apparatus is configured to print the content transmitted from the mobile apparatus.

\* \* \* \* \*